US010547860B2

(12) United States Patent
Zhou

(10) Patent No.: US 10,547,860 B2
(45) Date of Patent: Jan. 28, 2020

(54) VIDEO CODING WITH TRADE-OFF BETWEEN FRAME RATE AND CHROMA FIDELITY

(71) Applicant: Avago Technologies International Sales PTE. Limited, Singapore (SG)

(72) Inventor: Minhua Zhou, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 370 days.

(21) Appl. No.: 15/242,742

(22) Filed: Aug. 22, 2016

(65) Prior Publication Data

US 2017/0070743 A1    Mar. 9, 2017

Related U.S. Application Data

(60) Provisional application No. 62/216,066, filed on Sep. 9, 2015, provisional application No. 62/372,960, filed on Aug. 10, 2016.

(51) Int. Cl.
*H04N 19/44* (2014.01)
*H04N 19/152* (2014.01)

(52) U.S. Cl.
CPC .......... *H04N 19/44* (2014.11); *H04N 19/152* (2014.11)

(58) Field of Classification Search
CPC ........................... H04N 19/44; H04N 19/152
See application file for complete search history.

(56) References Cited

U.S. PATENT DOCUMENTS

| 2005/0195899 A1* | 9/2005 | Han | H04N 21/234327 375/240.21 |
|---|---|---|---|
| 2014/0003504 A1* | 1/2014 | Ugur | H04N 19/103 375/240.12 |
| 2015/0036755 A1* | 2/2015 | Garrett | H04N 21/42615 375/240.25 |

* cited by examiner

*Primary Examiner* — Maria E Vazquez Colon
(74) *Attorney, Agent, or Firm* — Foley & Lardner LLP

(57) ABSTRACT

A video decoder or encoder can be used to convert and process different video streams having different combinations of frame rate and Chroma fidelity. Rather than setting the maximum sample rate of the encoder based on a Luma sample rate, the encoder's throughput is set based on a maximum color sample rate. Additionally, the picture buffer size can be set based on a maximum number of color pictures. An input of the video decoder receives an input video stream having a given display resolution and encoded in a first format employing a first combination of frame rate and Chroma fidelity. Processing circuitry in the decoder converts the input video stream from the first format to an output video stream having a second format, the second format having the given display resolution and employing a second combination of frame rate and Chroma fidelity different from the first combination.

12 Claims, 15 Drawing Sheets

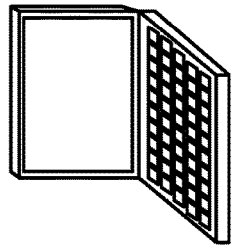

from media content provider and/or other source device

303

HDTV (e.g., 16:9)

FIG. 3C

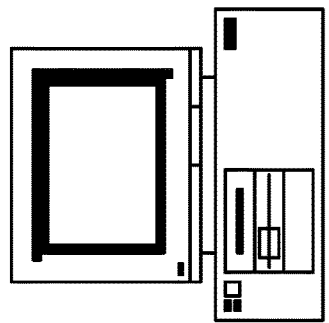

from media content provider and/or other source device

304

SDTV (e.g., 4:3)

FIG. 3D

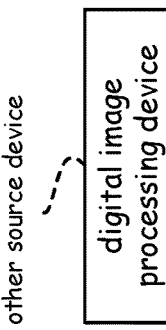

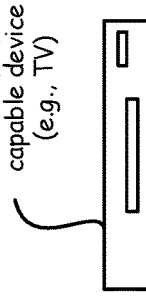

306 from media content provider set top box (SD and/or HD)

to display capable device (e.g., TV)

FIG. 3F

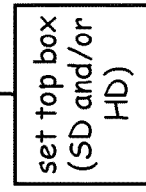

307

DVD player (e.g., Blu-Ray, SD, HD, etc.)

to display capable device (e.g., TV)

FIG. 3G

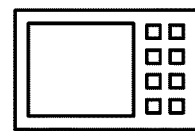

308 from media content provider and/or other source device digital image processing device to display capable device (e.g., TV)

FIG. 3H

VIDEO CODING WITH TRADE-OFF BETWEEN FRAME RATE AND CHROMA FIDELITY

CROSS REFERENCE TO RELATED PATENTS

The present U.S. Utility Patent Application claims priority pursuant to 35 U.S.C. § 119(e) to U.S. Provisional Application No. 62/216,066, entitled "VIDEO CODING WITH TRADE-OFF BETWEEN FRAME RATE AND CHROMA FIDELITY," filed Sep. 9, 2015, and U.S. Provisional Application No. 62/372,960, entitled "VIDEO CODING WITH TRADE-OFF BETWEEN FRAME RATE AND CHROMA FIDELITY," filed Aug. 10, 2016, which are incorporated herein by reference in their entirety, and made part of the present U.S. Utility Patent Application for all purposes.

BACKGROUND OF THE INVENTION

1. Technical Field of the Invention

The invention relates generally to digital video processing; and, more particularly, it relates to processing and operations in accordance with such digital video processing.

2. Description of Related Art

Communication systems that operate to communicate digital media (e.g., images, video, data, etc.) have been under continual development for many years. With respect to such communication systems employing some form of video data, a number of digital images are output or displayed at some frame rate (e.g., frames per second) to effectuate a video signal suitable for output and consumption. Within many such communication systems operating using video data, there can be a trade-off between throughput (e.g., number of image frames that may be transmitted from a first location to a second location) and video and/or image quality of the signal eventually to be output or displayed.

Profile and level specification is often used in a video compression standard to constrain video decoder complexity. A profile specifies a selected set of coding tools for a compliant decoder to implement, while a level constrains the decoder cost in terms of maximum bit-rate, maximum sample rate, maximum decoder picture buffer size, maximum luminance picture size, etc. Current technology lacks the flexibility to allow a system to deliver the best possible video quality by making the most efficient use of decoder resources.

BRIEF DESCRIPTION OF THE SEVERAL VIEWS OF THE DRAWINGS

FIG. 3A illustrates an embodiment of a computer.

FIG. 3B illustrates an embodiment of a laptop computer.

FIG. 3C illustrates an embodiment of a high definition (HD) television.

FIG. 3D illustrates an embodiment of a standard definition (SD) television.

FIG. 3E illustrates an embodiment of a handheld media unit.

FIG. 3F illustrates an embodiment of a set top box (STB).

FIG. 3G illustrates an embodiment of a digital video disc (DVD) player.

FIG. 3H illustrates an embodiment of a generic digital image and/or video processing device.

DETAILED DESCRIPTION OF THE INVENTION

In various embodiments described herein, A decoder can repurpose its memory usage usage and pixel processing capability based on the video format, including Chroma-format and frame-rate, of an incoming bitstream. Thus, in some embodiments, a decoder can support 4:2:0 streams with doubled maximum frame-rate and number of reference pictures.

For example, a decoder can decode a bitstream encoded in a first format and output video in the first format, e.g. in 4:2:0, and also decode a bitstream encoded in a second format, e.g. in 4:4:4, but the video output in 4:2:0 format is allowed to have doubled maximum frame-rate and number of reference pictures as compared to the video output in 4:4:4 format. That is to say, the decoder can trade decreased Chroma fidelity with frame-rate and number of reference pictures, but still use the same amount of processing and memory resources.

An encoder can similarly exercise a tradeoff between Chroma fidelity and frame-rate. For example, if an input video signal to the video encoder is 4:4:4@60 fps, but a compliant bitstream is limited to being encoded as 4:4:4@30 fps, various encoders described herein can choose whether to encode the incoming video, for as 4:4:4@30 fps with up to, for example, 5 reference pictures, or as 4:2:0@60 fps with up to, for example, 10 reference pictures for the same memory footprint, memory bandwidth and pixel processing speed.

Also, according to various embodiments, a transmitted bitstream created by an embodiment of an encoder and decoded by an embodiment of a decoder, supports such a trade-off between Chroma fidelity and frame-rate. Thus, in some implementations, a compliant bitstream can include a steam of the first format only, the second format only, or a mixed stream including portions encoded in both the first and second formats, where the first format may have a higher maximum allowable frame-rate and number of reference pictures, but a lower Chroma-fidelity, while the second format may have a higher Chroma fidelity but a lower allowable maximum frame-rate and number of reference pictures.

Figure 1:
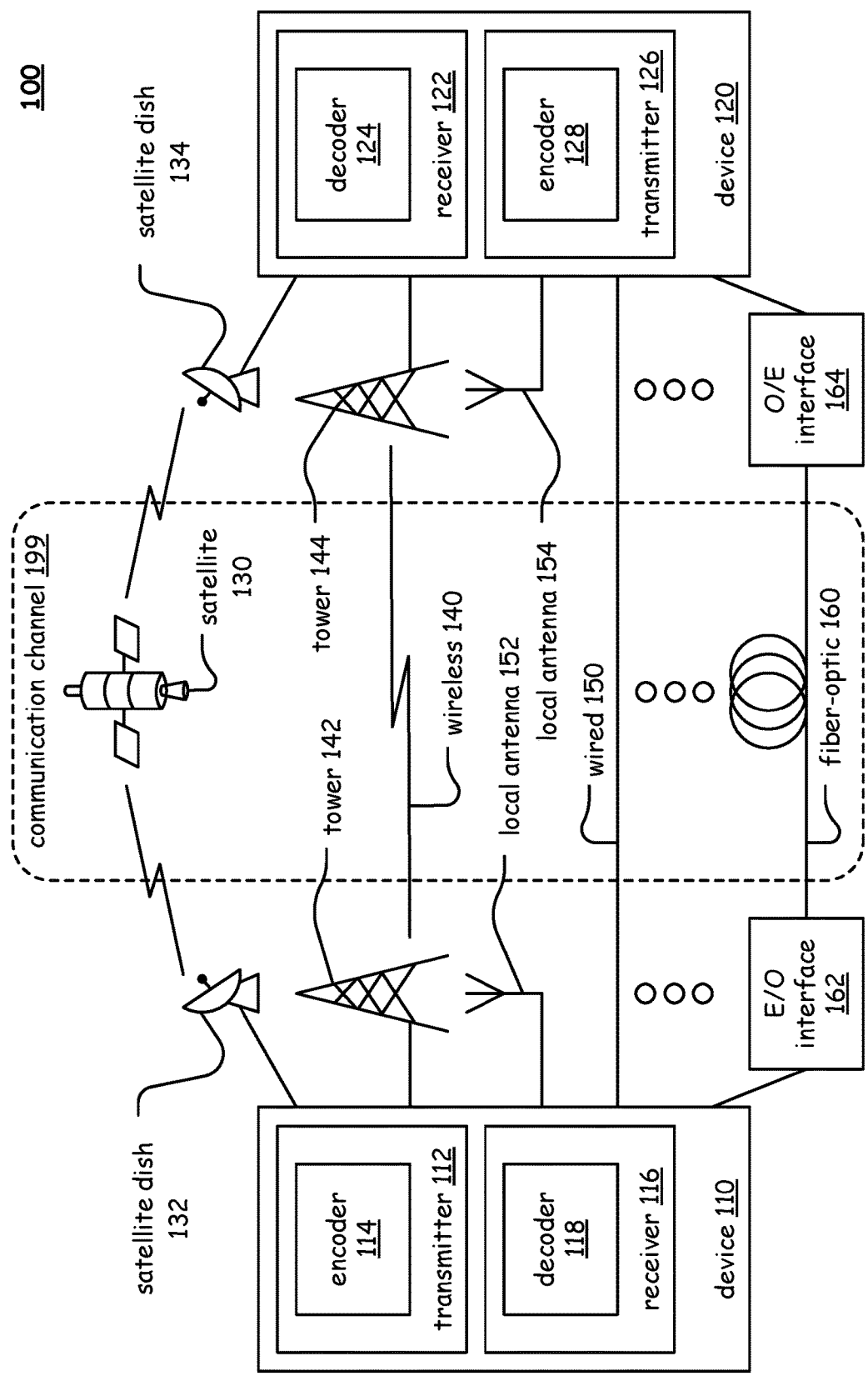
FIG. 1 and FIG. 2 illustrate various embodiments of communication systems.

Within many devices that use digital media such as digital video, respective images thereof, being digital in nature, are represented using pixels. Within certain communication systems, digital media can be transmitted from a first location to a second location at which such media can be output or displayed. The goal of digital communications systems, including those that operate to communicate digital video, is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and/or other types of media as well.

Figure 2:
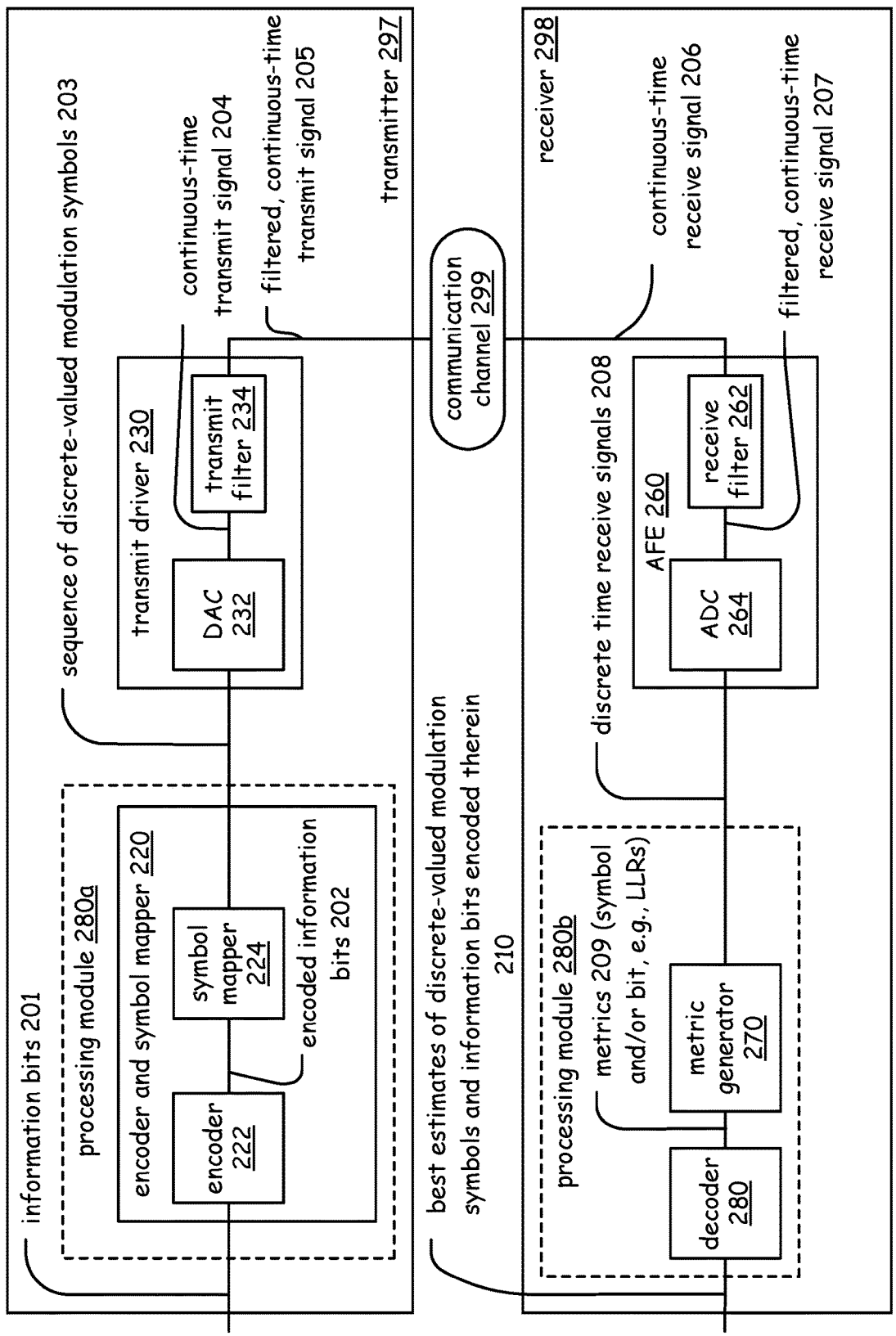

FIG. 1 and FIG. 2 are diagrams illustrating various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented/interfaced together thereby forming the communication channel 199.

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional embodiment such as in accordance with a video broadcast embodiment).

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks, such as encoder 222 that transmit encoded bits of information 202 to symbol mapper 224) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a decoder 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Digital image and/or video processing of digital images and/or media (including the respective images within a digital video signal) may be performed by any of the various devices depicted below in FIG. 3A-3H to allow a user to view such digital images and/or video. These various devices do not include an exhaustive list of devices in which the image and/or video processing described herein may be effectuated, and it is noted that any generic digital image and/or video processing device may be implemented to perform the processing described herein without departing from the scope and spirit of the invention.

FIG. 3A illustrates an embodiment of a computer 301. The computer 301 can be a desktop computer, or an enterprise storage device such a server, of a host computer that is attached to a storage array such as a redundant array of independent disks (RAID) array, storage router, edge router, storage switch and/or storage director. A user is able to view still digital images and/or video (e.g., a sequence of digital images) using the computer 301. Oftentimes, various image and/or video viewing programs and/or media player programs are included on a computer 301 to allow a user to view such images (including video).

FIG. 3B illustrates an embodiment of a laptop computer 302. Such a laptop computer 302 may be found and used in any of a wide variety of contexts. In recent years, with the ever-increasing processing capability and functionality found within laptop computers, they are being employed in many instances where previously higher-end and more capable desktop computers would be used. As with computer 301, laptop computer 302 may include various image viewing programs and/or media player programs to allow a user to view such images (including video).

FIG. 3C illustrates an embodiment of a high definition (HD) television 303. Many HD televisions 303 include an integrated tuner to allow the receipt, processing, and decoding of media content (e.g., television broadcast signals) thereon. Alternatively, sometimes an HD television 303 receives media content from another source such as a digital video disc (DVD) player, set top box (STB) that receives, processes, and decodes a cable and/or satellite television broadcast signal. Regardless of the particular implementation, the HD television 303 may be implemented to perform image and/or video processing as described herein. Generally speaking, an HD television 303 has capability to display HD media content and oftentimes is implemented having a 16:9 widescreen aspect ratio.

FIG. 3D illustrates an embodiment of a standard definition (SD) television 304. Of course, an SD television 304 is somewhat analogous to an HD television 303, with at least one difference being that the SD television 304 does not include capability to display HD media content, and an SD television 304 oftentimes is implemented having a 4:3 full screen aspect ratio. Nonetheless, even an SD television 304 may be implemented to perform image and/or video processing as described herein.

FIG. 3E illustrates an embodiment of a handheld media unit 305. A handheld media unit 305 may operate to provide general storage or storage of image/video content information such as joint photographic experts group (JPEG) files, tagged image file format (TIFF), bitmap, motion picture experts group (MPEG) files, Windows Media (WMA/WMV) files, other types of video content such as MPEG4 files, etc. for playback to a user, and/or any other type of information that may be stored in a digital format. Historically, such handheld media units were primarily employed for storage and playback of audio media; however, such a handheld media unit 305 may be employed for storage and playback of virtual any media (e.g., audio media, video media, photographic media, etc.). Moreover, such a handheld media unit 305 may also include other functionality such as integrated communication circuitry for wired and wireless communications. Such a handheld media unit 305 may be implemented to perform image and/or video processing as described herein.

FIG. 3F illustrates an embodiment of a set top box (STB) 306. As mentioned above, sometimes a STB 306 may be implemented to receive, process, and decode a cable and/or satellite television broadcast signal to be provided to any appropriate display capable device such as SD television 304 and/or HD television 303. Such an STB 306 may operate independently or cooperatively with such a display capable device to perform image and/or video processing as described herein.

FIG. 3G illustrates an embodiment of a digital video disc (DVD) player 307. Such a DVD player may be a Blu-Ray DVD player, an HD capable DVD player, an SD capable DVD player, an up-sampling capable DVD player (e.g., from SD to HD, etc.) without departing from the scope and spirit of the invention. The DVD player may provide a signal to any appropriate display capable device such as SD television 304 and/or HD television 303. The DVD player 307 may be implemented to perform image and/or video processing as described herein.

FIG. 3H illustrates an embodiment of a generic digital image and/or video processing device 308. Again, as mentioned above, these various devices described above do not include an exhaustive list of devices in which the image and/or video processing described herein may be effectuated, and it is noted that any generic digital image and/or video processing device 308 may be implemented to perform the image and/or video processing described herein without departing from the scope and spirit of the invention.

Figure 4:
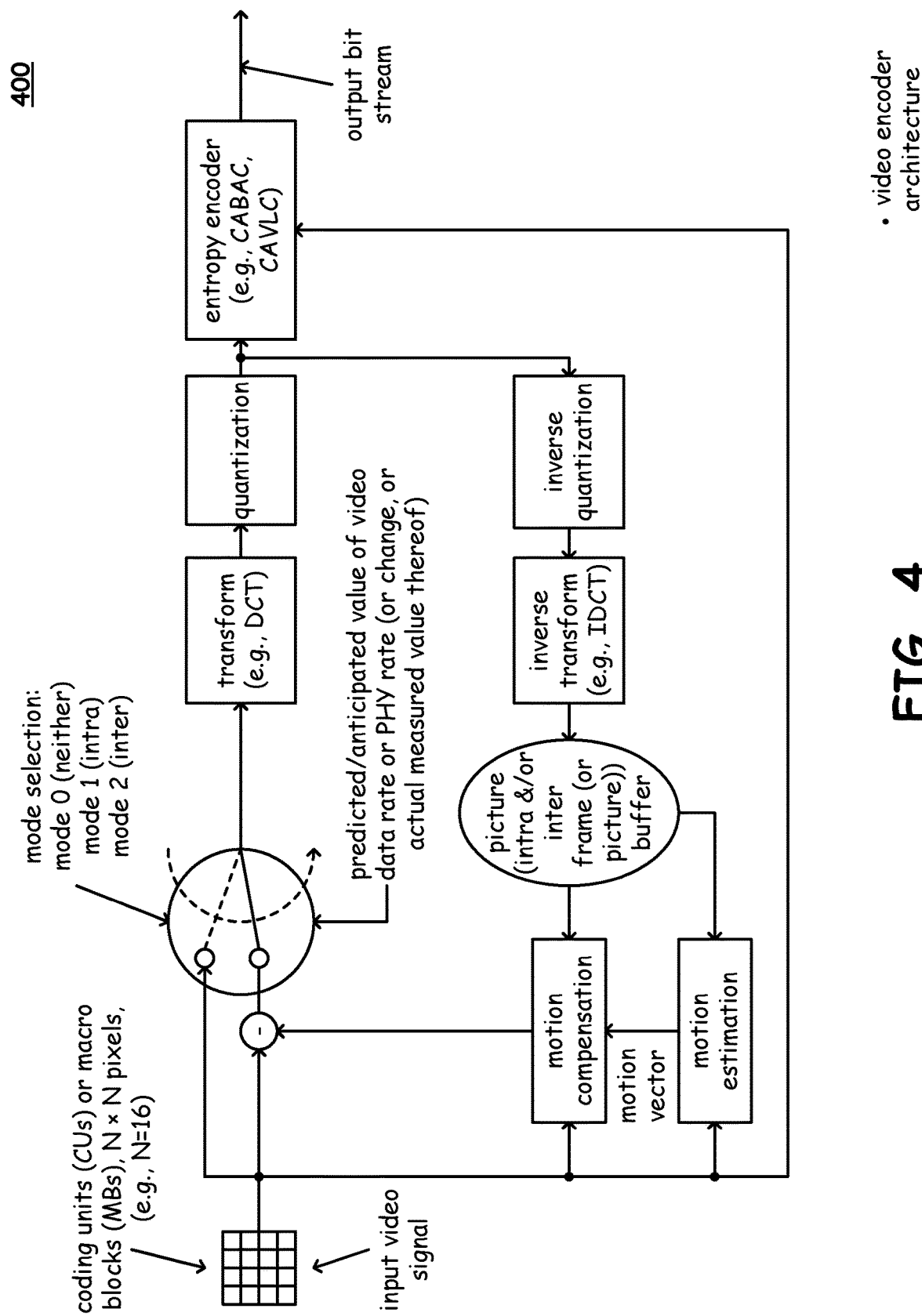
FIG. 4, FIG. 5, and FIG. 6 are diagrams illustrating various embodiments of video encoding architectures.
Figure 5:
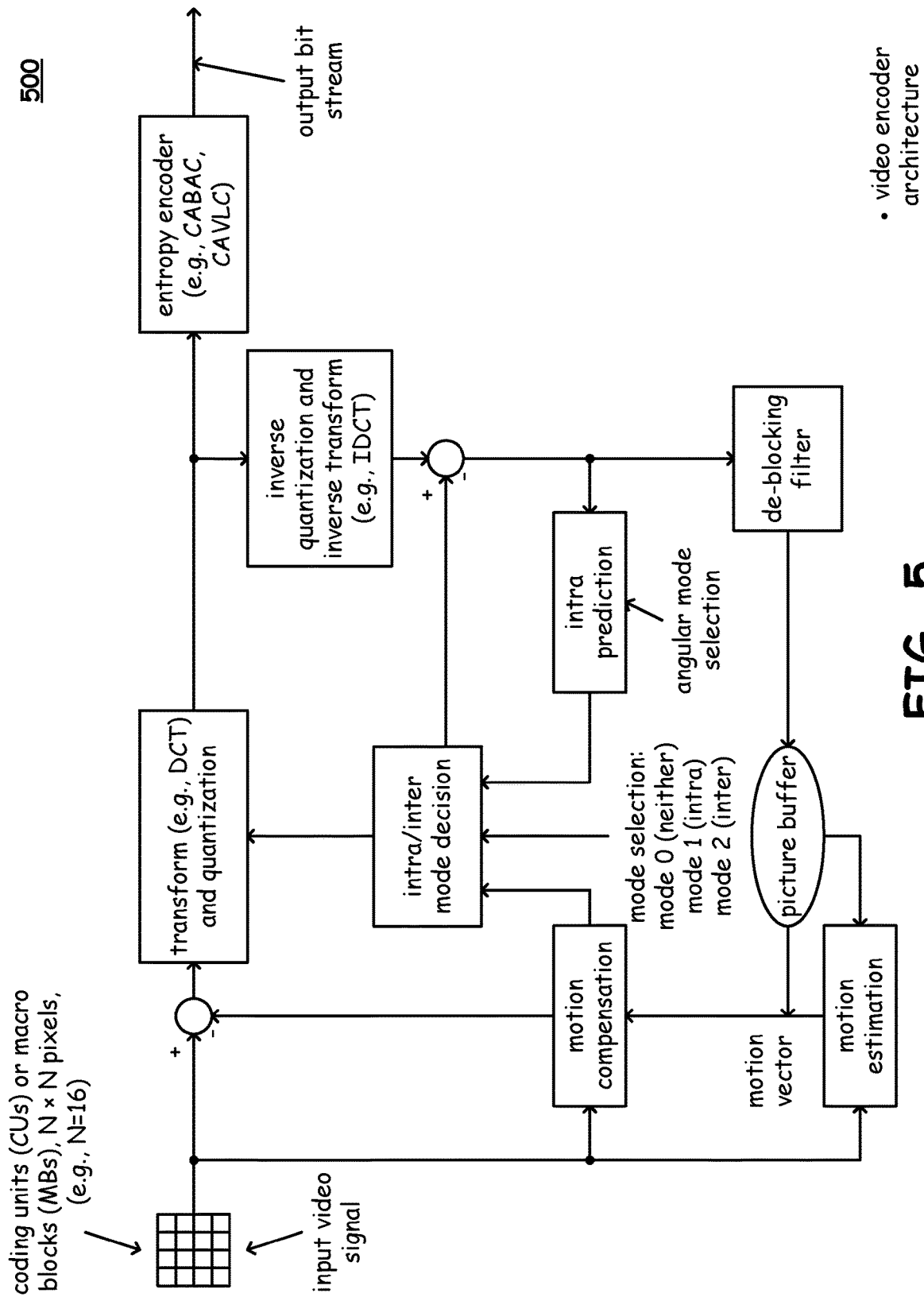
Figure 6:
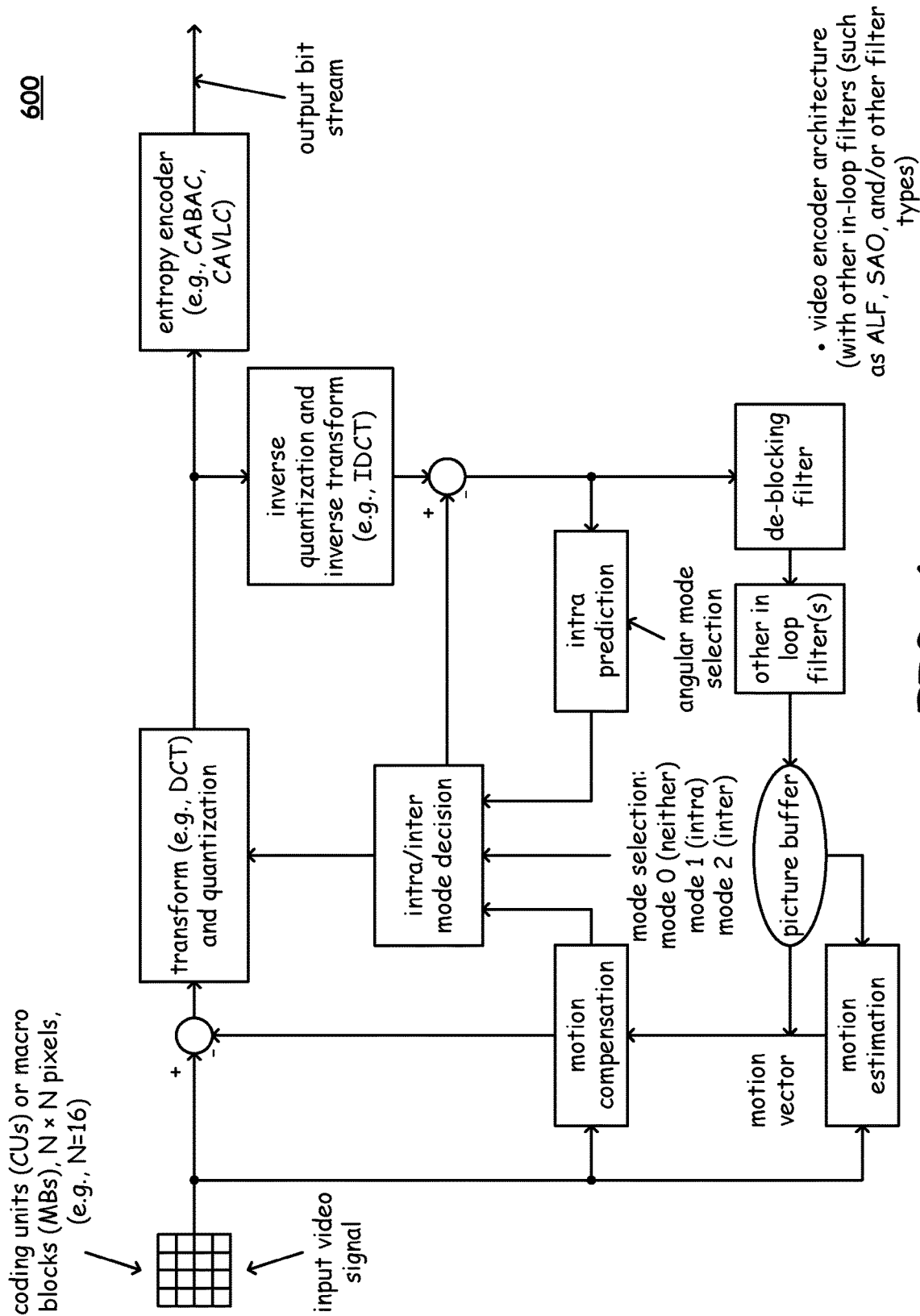

FIG. 4, FIG. 5, and FIG. 6 are diagrams illustrating various embodiments 400 and 500, and 600, respectively, of video encoding architectures.

Referring to embodiment 400 of FIG. 4, as may be seen with respect to this diagram, an input video signal is received by a video encoder. In certain embodiments, the input video signal is composed of coding units (CUs) or macro-blocks (MBs). The size of such coding units or macro-blocks may be varied and can include a number of pixels typically arranged in a square shape. In one embodiment, such coding units or macro-blocks have a size of 16×16 pixels. However, it is generally noted that a macro-block may have any desired size such as N×N pixels, where N is an integer (e.g., 16×16, 8×8, or 4×4). Of course, some implementations may include non-square shaped coding units or macro-blocks, although square shaped coding units or macro-blocks are employed in a preferred embodiment.

The input video signal may generally be referred to as corresponding to raw frame (or picture) image data. For example, raw frame (or picture) image data may undergo processing to generate luma and Chroma samples. In some embodiments, the set of luma samples in a macro-block is of one particular arrangement (e.g., 16×16), and set of the Chroma samples is of a different particular arrangement (e.g., 8×8). In accordance with the embodiment depicted herein, a video encoder processes such samples on a block by block basis.

The input video signal then undergoes mode selection by which the input video signal selectively undergoes intra and/or inter-prediction processing. Generally speaking, the input video signal undergoes compression along a compression pathway. When operating with no feedback (e.g., in accordance with neither inter-prediction nor intra-prediction), the input video signal is provided via the compression pathway to undergo transform operations (e.g., in accordance with discrete cosine transform (DCT)). Of course, other transforms may be employed in alternative embodiments. In this mode of operation, the input video signal itself is that which is compressed. The compression pathway may take advantage of the lack of high frequency sensitivity of human eyes in performing the compression.

However, feedback may be employed along the compression pathway by selectively using inter- or intra-prediction video encoding. In accordance with a feedback or predictive mode of operation, the compression pathway operates on a (relatively low energy) residual (e.g., a difference) resulting from subtraction of a predicted value of a current macro-block from the current macro-block. Depending upon which form of prediction is employed in a given instance, a residual or difference between a current macro-block and a predicted value of that macro-block based on at least a portion of that same frame (or picture) or on at least a portion of at least one other frame (or picture) is generated.

The resulting modified video signal then undergoes transform operations along the compression pathway. In one embodiment, a discrete cosine transform (DCT) operates on a set of video samples (e.g., luma, Chroma, residual, etc.) to compute respective coefficient values for each of a predetermined number of basis patterns. For example, one embodiment includes 64 basis functions (e.g., such as for an 8×8 sample). Generally speaking, different embodiments may employ different numbers of basis functions (e.g., different transforms). Any combination of those respective basis functions, including appropriate and selective weighting thereof, may be used to represent a given set of video samples. Additional details related to various ways of performing transform operations are described in the technical literature associated with video encoding including those standards/draft standards that have been incorporated by reference as indicated above. The output from the transform processing includes such respective coefficient values. This output is provided to a quantizer.

Generally, most image blocks will typically yield coefficients (e.g., DCT coefficients in an embodiment operating in accordance with discrete cosine transform (DCT)) such that the most relevant DCT coefficients are of lower frequencies. Because of this and of the human eyes' relatively poor sensitivity to high frequency visual effects, a quantizer may be operable to convert most of the less relevant coefficients to a value of zero. That is to say, those coefficients whose relative contribution is below some predetermined value (e.g., some threshold) may be eliminated in accordance with the quantization process. A quantizer may also be operable to convert the significant coefficients into values that can be coded more efficiently than those that result from the transform process. For example, the quantization process may operate by dividing each respective coefficient by an integer value and discarding any remainder. Such a process, when operating on typical coding units or macro-blocks, typically yields a relatively low number of non-zero coefficients which are then delivered to an entropy encoder for lossless encoding and for use in accordance with a feedback path which may select intra-prediction and/or inter-prediction processing in accordance with video encoding.

An entropy encoder operates in accordance with a lossless compression encoding process. In comparison, the quantization operations are generally lossy. The entropy encoding process operates on the coefficients provided from the quantization process. Those coefficients may represent various characteristics (e.g., luma, Chroma, residual, etc.). Various types of encoding may be employed by an entropy encoder. For example, context-adaptive binary arithmetic coding (CABAC) and/or context-adaptive variable-length coding (CAVLC) may be performed by the entropy encoder. For example, in accordance with at least one part of an entropy coding scheme, the data is converted to a (run, level) pairing (e.g., data 14, 3, 0, 4, 0, 0, −3 would be converted to the respective (run, level) pairs of (0, 14), (0, 3), (1, 4), (2,−3)). In advance, a table may be prepared that assigns variable length codes for value pairs, such that relatively shorter length codes are assigned to relatively common value pairs, and relatively longer length codes are assigned for relatively less common value pairs.

As the reader will understand, the operations of inverse quantization and inverse transform correspond to those of quantization and transform, respectively. For example, in an embodiment in which a DCT is employed within the transform operations, then an inverse DCT (IDCT) is that employed within the inverse transform operations.

A picture buffer, alternatively referred to as a digital picture buffer or a DPB, receives the signal from the IDCT module; the picture buffer is operative to store the current frame (or picture) and/or one or more other frames (or pictures) such as may be used in accordance with intra-prediction and/or inter-prediction operations as may be performed in accordance with video encoding. It is noted that in accordance with intra-prediction, a relatively small amount of storage may be sufficient, in that, it may not be necessary to store the current frame (or picture) or any other frame (or picture) within the frame (or picture) sequence. Such stored information may be employed for performing motion compensation and/or motion estimation in the case of performing inter-prediction in accordance with video encoding.

In one possible embodiment, for motion estimation, a respective set of luma samples (e.g., 16×16) from a current frame (or picture) are compared to respective buffered counterparts in other frames (or pictures) within the frame (or picture) sequence (e.g., in accordance with inter-prediction). In one possible implementation, a closest matching area is located (e.g., prediction reference) and a vector offset (e.g., motion vector) is produced. In a single frame (or picture), a number of motion vectors may be found and not all will necessarily point in the same direction. One or more operations as performed in accordance with motion estimation are operative to generate one or more motion vectors.

Motion compensation is operative to employ one or more motion vectors as may be generated in accordance with motion estimation. A prediction reference set of samples is identified and delivered for subtraction from the original input video signal in an effort hopefully to yield a relatively (e.g., ideally, much) lower energy residual. If such operations do not result in a yielded lower energy residual, motion compensation need not necessarily be performed and the transform operations may merely operate on the original input video signal instead of on a residual (e.g., in accordance with an operational mode in which the input video signal is provided straight through to the transform operation, such that neither intra-prediction nor inter-prediction are performed), or intra-prediction may be utilized and transform operations performed on the residual resulting from intra-prediction. Also, if the motion estimation and/or motion compensation operations are successful, the motion vector may also be sent to the entropy encoder along with the corresponding residual's coefficients for use in undergoing lossless entropy encoding.

The output from the overall video encoding operation is an output bit stream. It is noted that such an output bit stream may of course undergo certain processing in accordance with generating a continuous time signal which may be transmitted via a communication channel. For example, certain embodiments operate within wireless communication systems. In such an instance, an output bitstream may undergo appropriate digital to analog conversion, frequency conversion, scaling, filtering, modulation, symbol mapping, and/or any other operations within a wireless communication device that operate to generate a continuous time signal capable of being transmitted via a communication channel, etc.

Referring to embodiment 500 of FIG. 5, as may be seen in comparing this diagram to the pervious diagram (i.e. FIG. 4), the signal path output from the inverse quantization and inverse transform (e.g., IDCT) block, which is provided to the intra-prediction block, is also provided to a de-blocking filter. A de-blocking filter is implemented to process the reconstructed block, which are the output from the inverse transform block plus intra or inter prediction block. Such an in-loop filter is applied to the decoded picture before it is stored in a picture buffer (sometimes referred to as a DPB, digital picture buffer). The de-blocking filter is implemented to reduce coding noise of the decoded picture, and the filtering thereof may be selectively applied on a slice by slice basis, respectively, for luminance and chrominance whether or not the de-blocking filter is applied either at slice level or at block level or at pixel level.

Referring to embodiment 600 of FIG. 6, with respect to this diagram depicting an alternative embodiment of a video encoder, such a video encoder carries out prediction, transform, and encoding processes to produce a compressed output bit stream. Such a video encoder may operate in accordance with and be compliant with one or more video encoding protocols, standards, and/or recommended practices such as ISO/IEC 14496-10—MPEG-4 Part 10, AVC (Advanced Video Coding), alternatively referred to as H.264/MPEG-4 Part 10 or AVC (Advanced Video Coding), ITU H.264/MPEG4-AVC.

It is noted that a corresponding video decoder, such as located within a device at another end of a communication channel, is operative to perform the complementary processes of decoding, inverse transform, and reconstruction to produce a respective decoded video sequence that is (ideally) representative of the input video signal.

In comparing this diagram to the pervious diagram, in which the signal path output from the inverse quantization and inverse transform (e.g., IDCT) block is provided to both the intra-prediction block and a de-blocking filter, the output from the de-blocking filter is provided to one or more other in-loop filters (e.g., implemented in accordance with adaptive loop filter (ALF), sample adaptive offset (SAO) filter, and/or any other filter type) implemented to process the output from the inverse transform block. For example, in one possible embodiment, a SAO filter is applied to the decoded picture before it is stored in a picture buffer (again, sometimes alternatively referred to as a DPB, digital picture buffer).

With respect to any video encoder architecture implemented to generate an output bitstream, it is noted that such architectures may be implemented within any of a variety of communication devices. The output bitstream may undergo additional processing including error correction code (ECC), forward error correction (FEC), etc. thereby generating a modified output bitstream having additional redundancy deal therein. Also, as may be understood with respect to such a digital signal, it may undergo any appropriate processing in accordance with generating a continuous time signal suitable for or appropriate for transmission via a communication channel. That is to say, such a video encoder architecture may be implemented within a communication device operative to perform transmission of one or more signals via one or more communication channels. Additional processing may be made on an output bitstream generated by such a video encoder architecture thereby generating a continuous time signal that may be launched into a communication channel.

Figure 7:
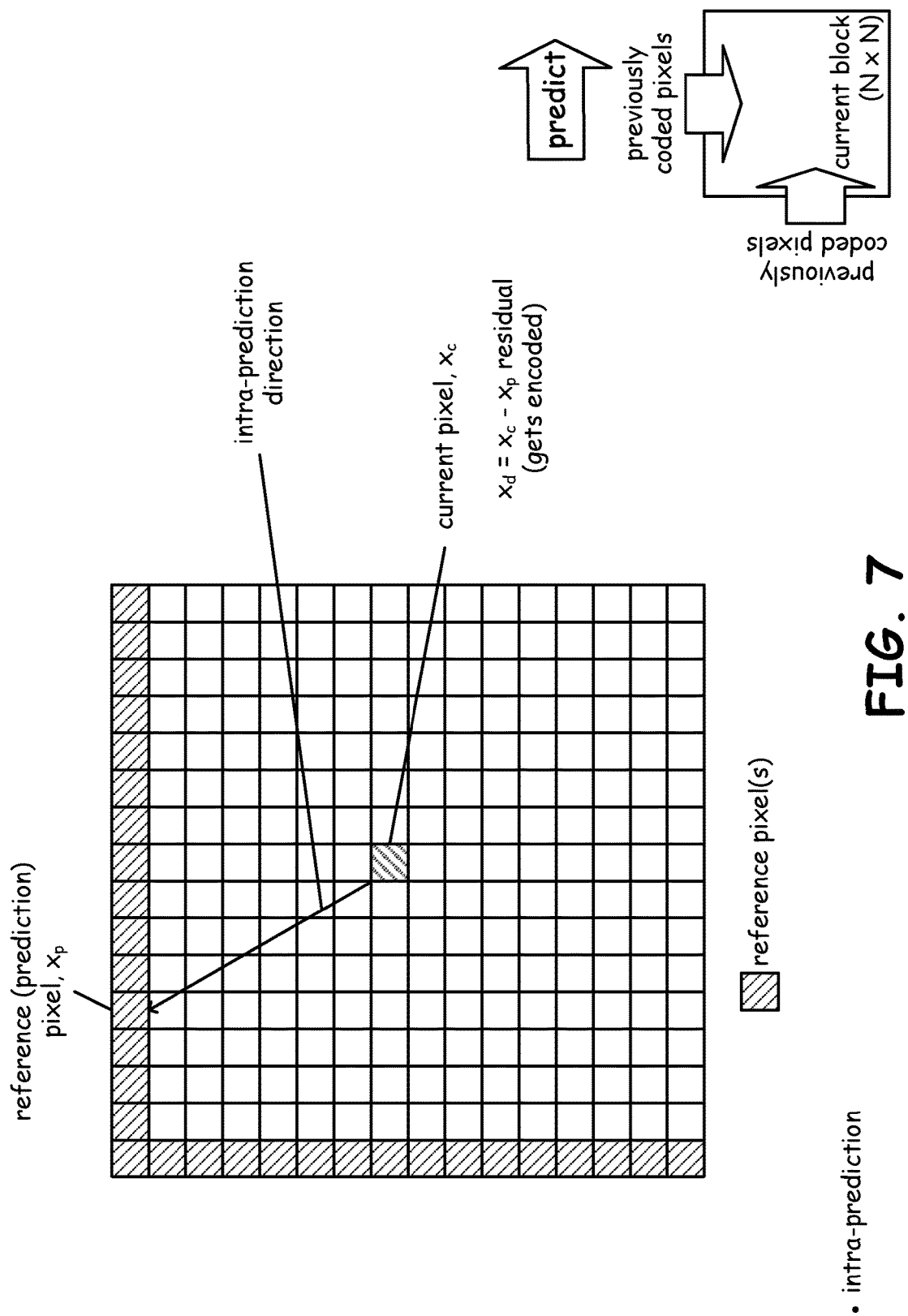
FIG. 7 is a diagram illustrating an embodiment of intra-prediction processing.

FIG. 7 is a diagram illustrating an embodiment 700 of intra-prediction processing. As can be seen with respect to this diagram, a current block of video data (e.g., often times being square in shape and including generally N×N pixels) undergoes processing to estimate the respective pixels therein. Previously coded pixels located above and to the left of the current block are employed in accordance with such intra-prediction. From certain perspectives, an intra-prediction direction may be viewed as corresponding to a vector extending from a current pixel to a reference pixel located above or to the left of the current pixel. Details of intra-prediction as applied to coding in accordance with H.264/AVC are specified within the corresponding standard (e.g., International Telecommunication Union, ITU-T, TELECOMMUNICATION STANDARDIZATION SECTOR OF ITU, H.264 (March 2010), SERIES H: AUDIOVISUAL AND MULTIMEDIA SYSTEMS, Infrastructure of audiovisual services—Coding of moving video, Advanced video coding for generic audiovisual services, Recommendation ITU-T H.264, also alternatively referred to as International Telecomm ISO/IEC 14496-10—MPEG-4 Part 10, AVC (Advanced Video Coding), H.264/MPEG-4 Part 10 or AVC (Advanced Video Coding), ITU H.264/MPEG4-AVC, or equivalent) that is incorporated by reference above.

The residual, which is the difference between the current pixel and the reference or prediction pixel, is that which gets encoded. As can be seen with respect to this diagram, intra-prediction operates using pixels within a common frame (or picture). It is of course noted that a given pixel may have different respective components associated therewith, and there may be different respective sets of samples for each respective component.

Figure 8:
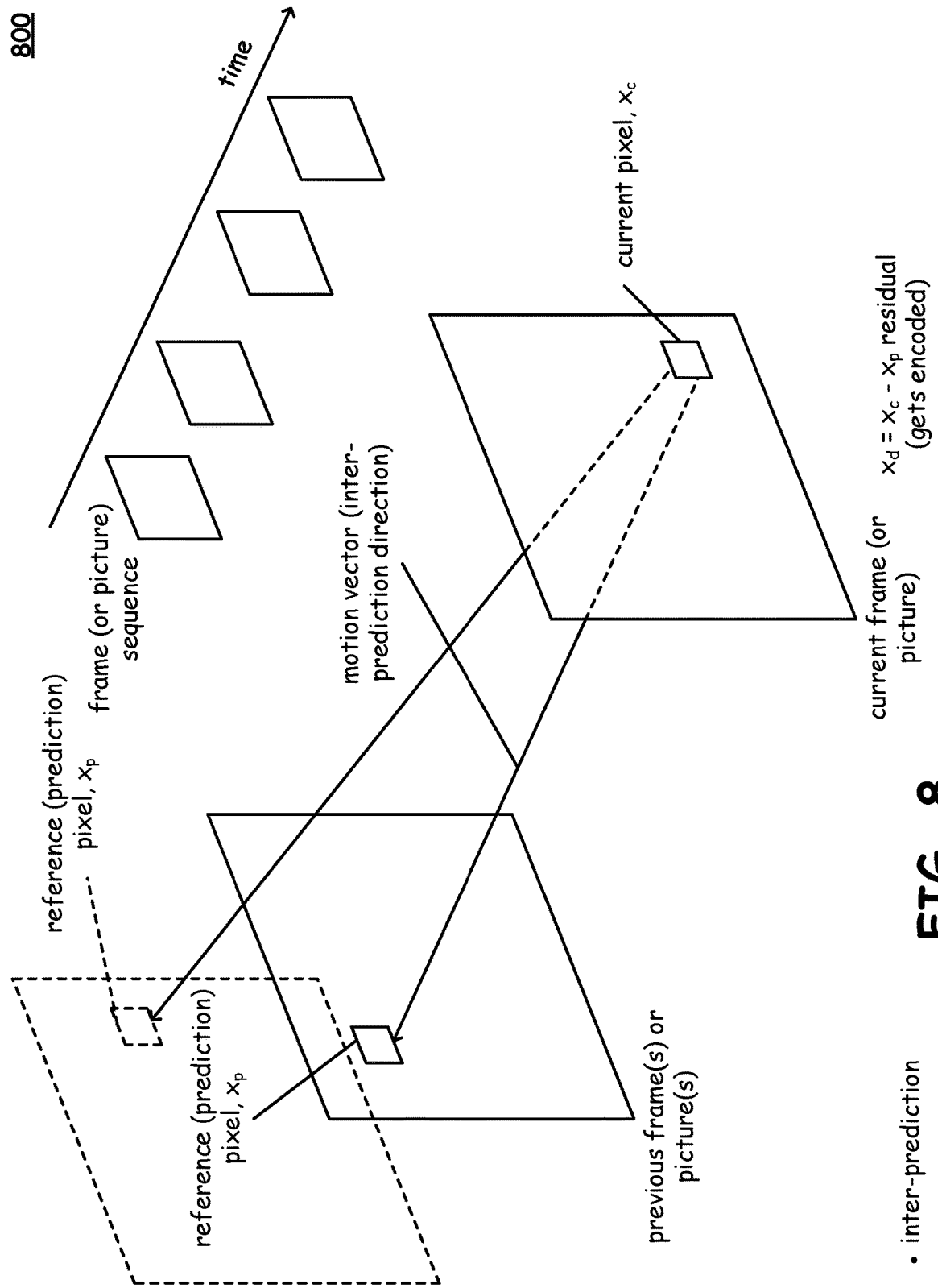
FIG. 8 is a diagram illustrating an embodiment of inter-prediction processing.

FIG. 8 is a diagram illustrating an embodiment 800 of inter-prediction processing. In contradistinction to intra-prediction, inter-prediction is operative to identify a motion vector (e.g., an inter-prediction direction) based on a current set of pixels within a current frame (or picture) and one or more sets of reference or prediction pixels located within one or more other frames (or pictures) within a frame (or picture) sequence. As can be seen, the motion vector extends from the current frame (or picture) to another frame (or picture) within the frame (or picture) sequence. Inter-prediction may utilize sub-pixel interpolation, such that a prediction pixel value corresponds to a function of a plurality of pixels in a reference frame or picture.

A residual may be calculated in accordance with inter-prediction processing, though such a residual is different from the residual calculated in accordance with intra-prediction processing. In accordance with inter-prediction processing, the residual at each pixel again corresponds to the difference between a current pixel and a predicted pixel value. However, in accordance with inter-prediction processing, the current pixel and the reference or prediction pixel are not located within the same frame (or picture). While this diagram shows inter-prediction as being employed with respect to one or more previous frames or pictures, it is also noted that alternative embodiments may operate using references corresponding to frames before and/or after a current frame. For example, in accordance with appropriate buffering and/or memory management, a number of frames may be stored. When operating on a given frame, references may be generated from other frames that precede and/or follow that given frame.

Coupled with the CU, a basic unit may be employed for the prediction partition mode, namely, the prediction unit, or PU. It is also noted that the PU is defined only for the last depth CU, and its respective size is limited to that of the CU.

Figure 9:
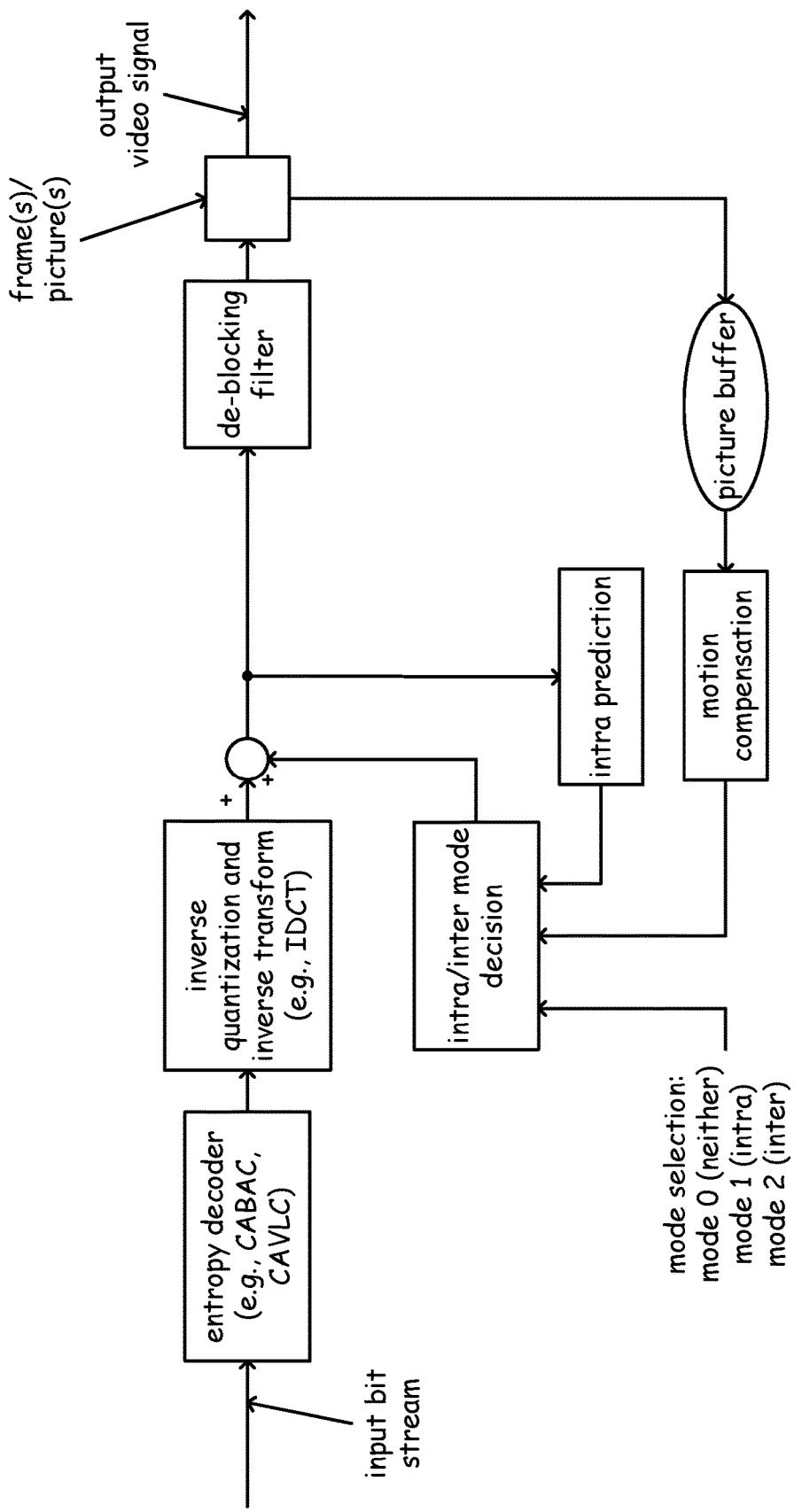
FIG. 9 is a diagram illustrating various embodiments of video decoding architectures.
Figure 10:
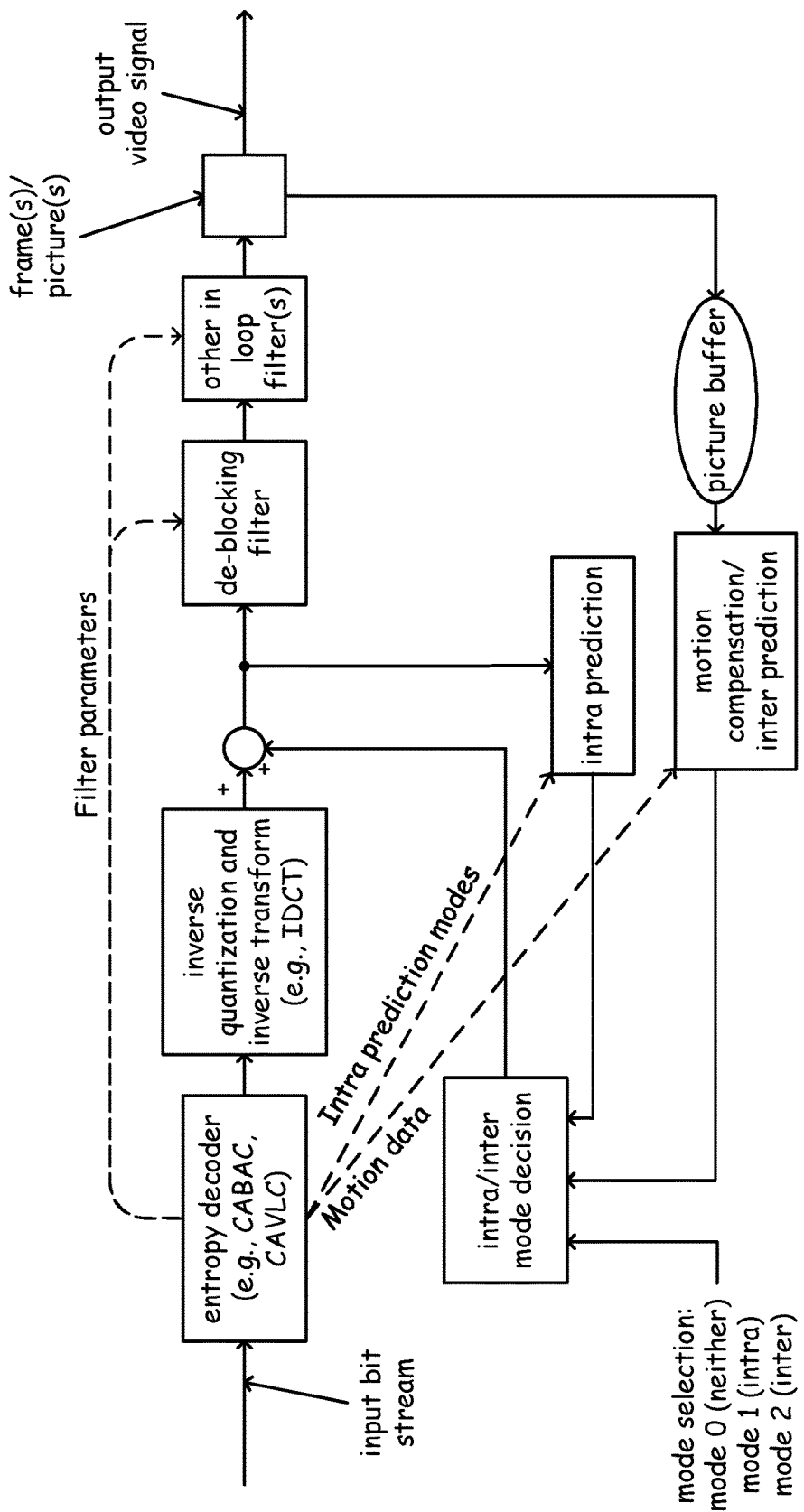
FIG. 10 is a diagram illustrating a video decoder according to various embodiments of the present disclosure.

FIG. 9 and FIG. 10 are diagrams illustrating various embodiments 900 and 1000, respectively, of video decoding architectures.

Generally speaking, such video decoding architectures operate on an input bitstream. It is of course noted that such an input bitstream may be generated from a signal that is received by a communication device from a communication channel. Various operations may be performed on a continuous time signal received from the communication channel, including digital sampling, demodulation, scaling, filtering, etc. such as may be appropriate in accordance with generating the input bitstream. Moreover, certain embodiments, in which one or more types of error correction code (ECC), forward error correction (FEC), etc. may be implemented, may perform appropriate decoding in accordance with such ECC, FEC, etc. thereby generating the input bitstream. That is to say, in certain embodiments in which additional redundancy may have been made in accordance with generating a corresponding output bitstream (e.g., such as may be launched from a transmitter communication device or from the transmitter portion of a transceiver communication device), appropriate processing may be performed in accordance with generating the input bitstream. Overall, such a video decoding architectures and lamented to process the input bitstream thereby generating an output video signal corresponding to the original input video signal, as closely as possible and perfectly in an ideal case, for use in being output to one or more video display capable devices.

Referring to the embodiment 900 of FIG. 9, generally speaking, a decoder such as an entropy decoder (e.g., which may be implemented in accordance with CABAC, CAVLC, etc.) processes the input bitstream in accordance with performing the complementary process of encoding as performed within a video encoder architecture. The input bitstream may be viewed as being, as closely as possible and perfectly in an ideal case, the compressed output bitstream generated by a video encoder architecture. Of course, in a real-life application, it is possible that some errors may have been incurred in a signal transmitted via one or more communication links. The entropy decoder processes the input bitstream and extracts the appropriate coefficients, such as the DCT coefficients (e.g., such as representing Chroma, luma, etc. information) and provides such coefficients to an inverse quantization and inverse transform block. In the event that a DCT transform is employed, the inverse quantization and inverse transform block may be implemented to perform an inverse DCT (IDCT) operation.

Subsequently, A/D blocking filter is implemented to generate the respective frames and/or pictures corresponding to an output video signal. These frames and/or pictures may be provided into a picture buffer, or a digital picture buffer (DPB) for use in performing other operations including motion compensation. Generally speaking, such motion compensation operations may be viewed as corresponding to inter-prediction associated with video encoding. Also, intra-prediction may also be performed on the signal output from the inverse quantization and inverse transform block. Analogously as with respect to video encoding, such a video decoder architecture may be implemented to perform mode selection between performing it neither intra-prediction nor inter-prediction, inter-prediction, or intra-prediction in accordance with decoding an input bitstream thereby generating an output video signal.

Referring to FIG. 10, a video decoder 1000 is illustrated. Video decoder 1000 can be an HEVC video decoder, and includes an entropy decoder, for example a CABAC decoder; inverse quantization and inverse transform module or modules; an intra prediction module; an inter prediction/motion compensation module; an intra/inter mode decision module; a de-blocking filter and other loop filters; and a picture buffer. In various embodiments, the other loop filters include one or more in-loop filters, which can be implemented as adaptive loop filters (ALFs), sample adaptive offset (SAO) filters, and/or another suitable filter type. These other loop filters can be implemented to be compatible with the video encoding process used to encode the input bit stream. Video decoder 1000 generates an output bitstream representing video frames/pictures of an output video signal. In one embodiment, an appropriate implementation of one or more such in-loop filters is after the de-blocking filter. In accordance with various embodiments, a sample adaptive offset (SAO) process may be performed after the completion of the de-blocking filter process for the decoded picture (e.g., such as in accordance with an SAO filter implemented within the other in loop filter(s). This process can be performed on a region basis, which is defined to be one or more complete largest coding units (LCUs).

In an example of operation, an incoming compressed input bitstream is entropy (CABAC) decoded. The CABAC decoding block delivers information about quantized transform coefficients, intra prediction modes, motion data and filter parameters for the current coding unit (CU). The quantized transform coefficients go through the process of inverse quantization and inverse transform to derive the residual blocks for the CU. The intra prediction modes are fed into the intra prediction block to produce the intra prediction blocks for the current CU, and the motion data is input to the inter prediction block to produce the motion-compensated prediction blocks for the current CU. Depending on whether the CU is intra or inter-coded, the intra or inter prediction blocks are added to the residual blocks (i.e. inverse transform output) to form the reconstructed CU before in-loop filtering. Finally, the in-loop filtering (e.g. de-blocking filter and Sample Adaptive Offset (SAO)) is performed to obtain the final reconstructed CU.

The maximum bit-rate specified in a level defines the required CABAC throughput of a compliant decoder. The maximum sample rate defines the required throughput of the rest of function blocks (i.e. motion compensation, intra prediction, inverse quantization and inverse transform, de-blocking filter and SAO) in video decoder 1000. The maximum decoder picture buffer size defines the required memory size to buffer the reference pictures and the reconstructed picture; and the maximum luminance picture size defines the maximum picture size supported by the level.

In existing standards such as ISO/IEC MPEG HEVC/ITU-T H.265, ISO/IEC MPEG AVC/ITU-T H.264 and ISO/IEC MPEG2 ITU-T H.262, the maximum sample rate defined in a level is specified in terms of maximum luma sample rate. That is, for a 4:4:4 (Y:Cr:Cb) profile which may support not only 4:4:4 Chroma format, but also 4:2:0 and 4:2:2 Chroma-formats, the throughput requirement is the same in terms of number of luma pictures per second regardless of Chroma format. For example, in conventional standards, if a level specifies the maximum sample rate as UHD 2160p@30 (3840×2160 at 30 fps), then the required decoder sample throughput is always 30 fps for 2160p video, regardless of Chroma format (4:4:4, 4:2:2, 4:2:0).

The restriction discussed above may not be desirable in all video applications. It is well known that high frame rate (HFR) is advantageous to reducing motion blur in high-motion sequences such as sports programs, while using full-fidelity Chroma format 4:4:4 can avoid color down-sampling artifacts caused by reduced Chroma fidelity such as using Chroma format 4:2:0. Having the flexibility of configuring an encoder or decoder with different combinations of frame-rate and Chroma fidelity can lead to better video quality in video applications. For the example given the above, it would be advantageous to remove the restriction on sample throughput, so that a UHD 2160p@30 4:4:4 decoder can be repurposed as a UHD 2160p@60 4:2:0 decoder. Thus, according to various embodiments disclosed herein, the same decoder can deal with the mixed content (in terms of frame-rate and Chroma-format combinations) for the same amount of decoder resources. For instance, 2160p@30 4:4:4 mode can be used for non-high motion video scenes for better color fidelity, while 2160p@60 4:2:0 mode can be used for high motion sports scenes for better motion fidelity.

In general, the implementation cost of a video decoder mainly depends on the following factors:

Coding tools required to support that impact the logic area.

Maximum luma picture size that determines line buffer size.

Maximum bit-rate that determines required entropy (e.g. CABAC) decoding throughput.

Maximum sample rate that determines required sample throughput of the decoder.

Decoder picture buffer size that determines the memory size needed for buffering the reference pictures and currently reconstructed picture.

In at least one embodiment of the present disclosure, a level definition can be implemented that takes into account the Chroma format. The following changes to a level definition can be used according to various embodiments: 1) the maximum sample rate can be defined as the maximum color sample rate instead of maximum luma sample rate; and 2) the decoder picture buffer size (e.g. maxDpbPicBuf in HEVC spec) can be defined as number of color pictures. With these changes, it becomes possible to repurpose a high color fidelity decoder (e.g. a 4:4:4 profile decoder) to run at a higher frame-rate and use more number of reference pictures when it is configured to use a low Chroma format (e.g. 4:2:0, 4:2:2), thus enabling the quality trade-off between frame-rate and Chroma fidelity. Consider the following example.

Let MaxLumaPs (samples) be the maximum luma picture size, the maximum color sample rate (in terms of samples per second) is defined as:

$$MaxLumaPs*cf*MaxPictureRate$$

Where cf=3 for Chroma format 4:4:4, 2 for Chroma format 4:2:2 and 1.5 for Chroma format 4:2:0, and MaxPictureRate is the maximum allowable picture rate when picture size is configured to the maximum picture size defined by MaxLumaPs.

For a level, the product of cf and MaxPictureRate is a constant, so that using different Chroma format yields different maximum allowable picture rate. For example, if using Chroma-format 4:4:4 leads to a maximum picture rate MaxPictureRate of 30 fps, then the maximum picture rate MaxPictureRate is 60 fps for Chroma-format 4:2:0.

Let maxDpbPicBuf be the maximum number of pictures that can be stored in the decoder picture buffer, the picture size here is configured to the maximum luma picture size (defined by MaxLumaPs), the size of decoder picture buffer (in terms of samples) is defined as $$MaxLumaPs*cf*maxDpbPicBuf$$

For a level, the product of cf and maxDpbPicBuf is a constant, so that using different Chroma format yields different number of pictures that can be buffered by decoder. For example, if using Chroma-format 4:4:4 leads to a value of maxDpbPicBuf of 6, then the value of maxDpbPicBuf is 12 for Chroma-format 4:2:0.

The proposed modifications in level definition enable use of trade-off between frame-rate and Chroma format for high color fidelity profile decoder such as a 4:4:4 profile decoder. For a same amount of decoder resource, i.e. memory bandwidth, decoder picture buffer size, on-chip line buffer size, CABAC entropy decoding speed (throughput), decoder sample process speed (throughput), the decoder can operate with different combinations of frame-rate and Chroma format (e.g. 2160p@30 4:4:4 vs. 2160p@60 4:2:0). With the proposed level specification, the following encoding and decoding structures and methods may be realized.

Figure 11:
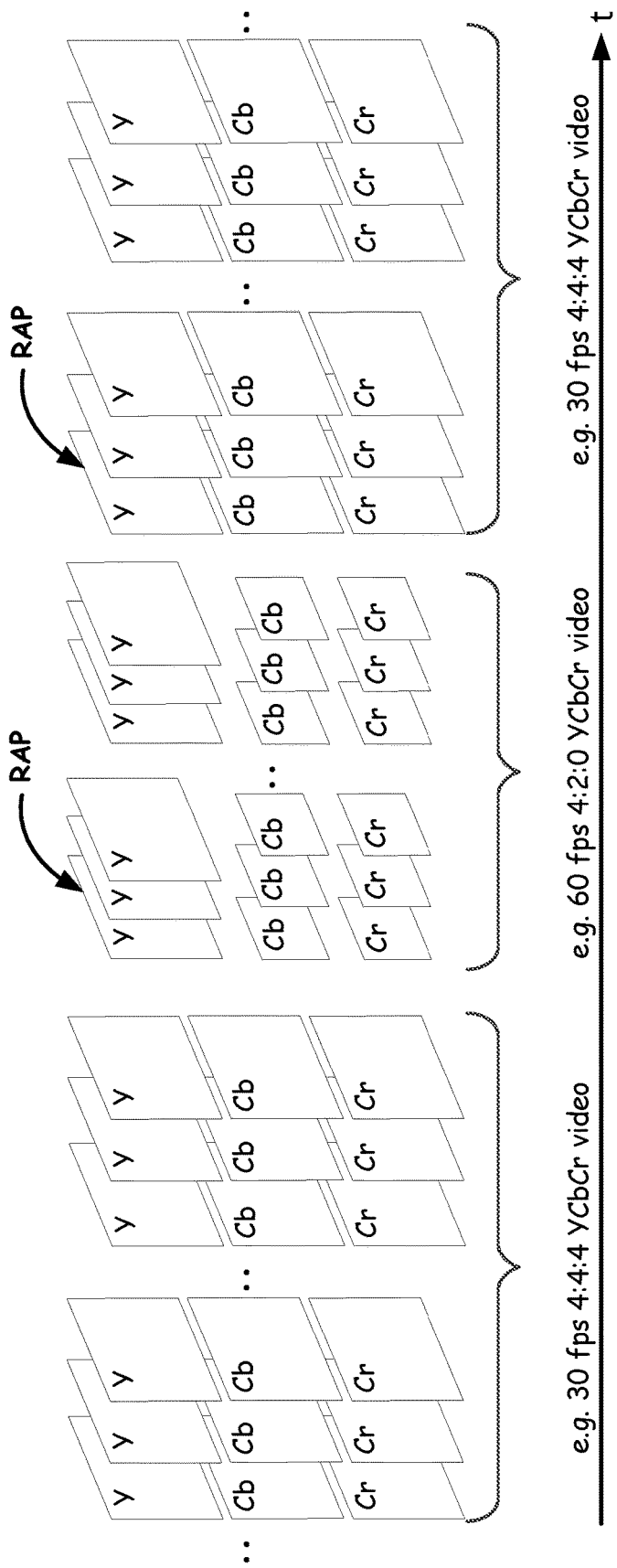
FIG. 11 is a diagram illustrating a use case in which there is no inter-prediction across video transition boundaries of same color space according to various embodiments of the present disclosure.

Referring next to FIG. 11 a method 1100 in which there is no inter-prediction across video transition boundaries of same color space is discussed according to various embodiments of the present disclosure. As shown in FIG. 11, a video may be captured (and played-back) with different frame-rate and Chroma-format. In this example, the video transits from 30 fps 4:4:4 to 60 fps 4:2:0 then back to 30 fps 4:4:4. To minimize encoder/decoder complexity, in embodiment 1 the inter-prediction of a video encoder/decoder is restricted not to cross the video transition boundaries, that is, the first picture after a video transition (e.g. from 4:4:4 to 4:2:0 and vice versa) is always coded with as a RAP (Random Access Picture). A RAP breaks inter-prediction dependency at the video transition boundary by forcing an encoder/decoder to flush the decoder picture buffer.

In some embodiments, the level definition can take into consideration the video bit-depth for the specification of maximum decoder picture buffer size and maximum sample rate. For example, a 10-bit 2160p@60 video decoder may be repurposed as an 8-bit 2160p video decoder of higher frame rate.

Method 1100 requires the least amount of encoder/decoder complexity increase since no reference picture buffer manipulation (i.e. reference picture up- or down-sampling, color space conversion, etc.) at video transition boundary is needed. It allows the maximum amount of coding flexibility. At the video transition boundary, not only frame rate and Chroma-format but also the luma picture size and color space can be different.

Figure 12:
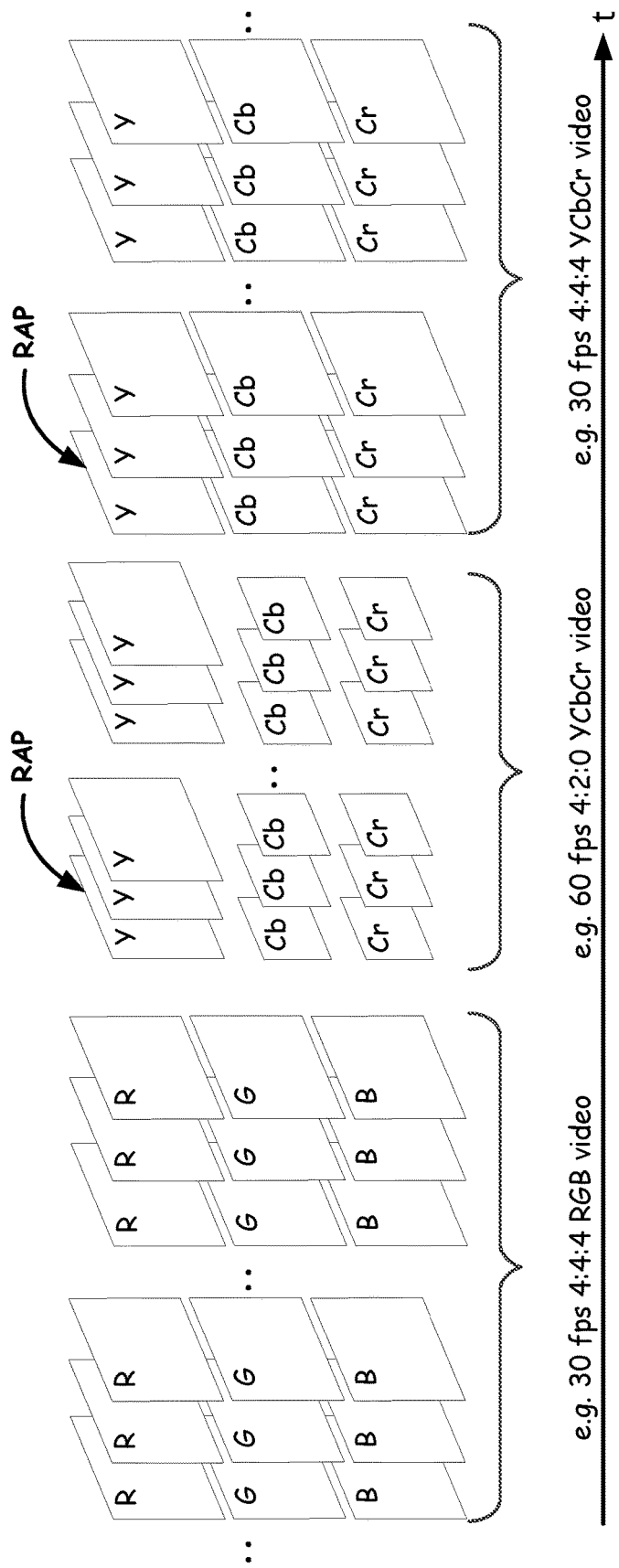
FIG. 12 is a diagram illustrating a use case in which there is no inter-prediction across video transition boundaries of different color spaces according to various embodiments of the present disclosure.

Referring next to FIG. 12, a method 1200 in which there is no inter-prediction across video transition boundaries of different color spaces is discussed according to various embodiments of the present disclosure. Method 1200 is similar to the method discussed with reference to FIG. 11, except that the color space is different during the transition from 4:4:4 30 fps RGB video to 4:2:0 60 fps YCbCr video.

Figure 13:
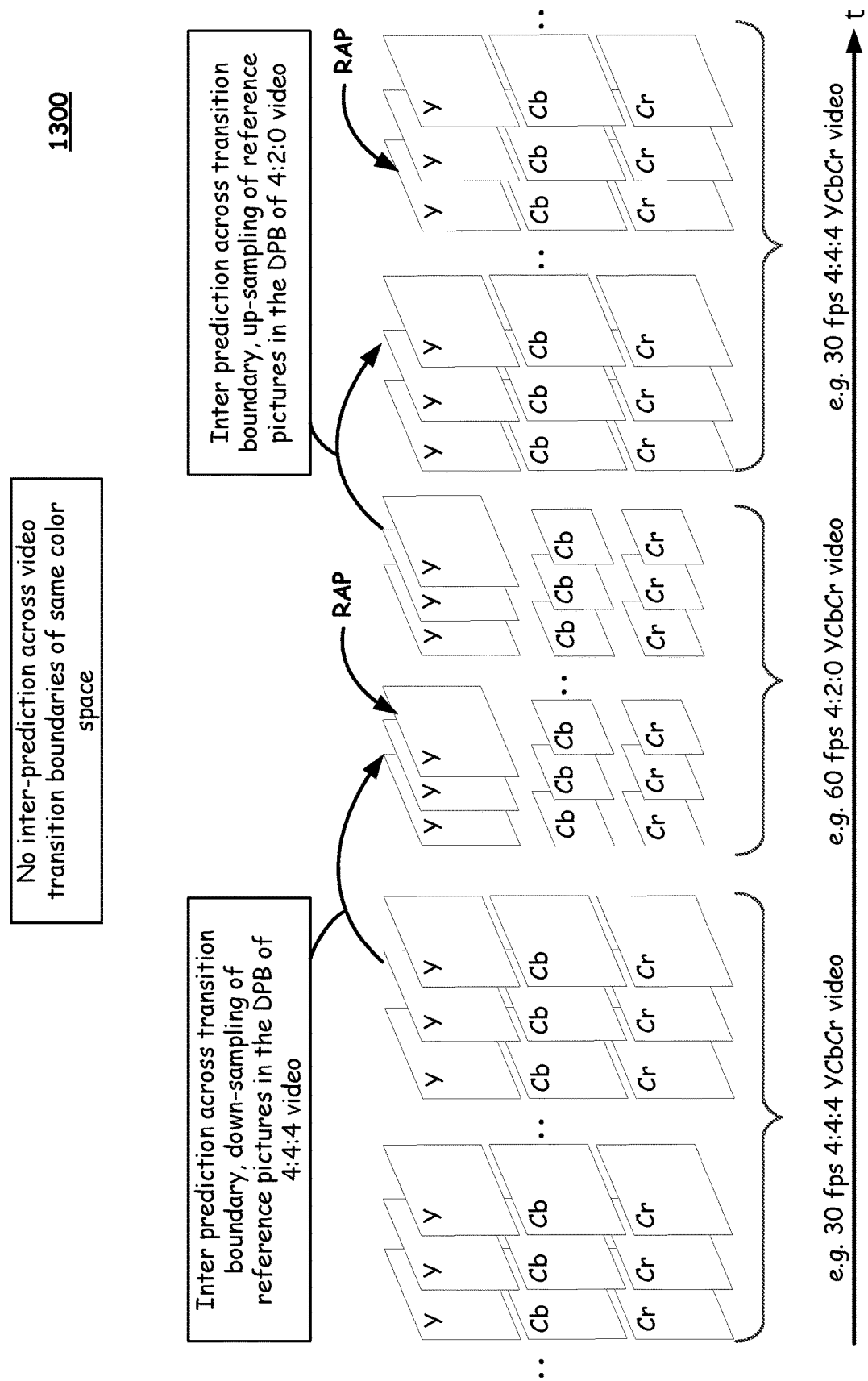
FIG. 13 is a diagram illustrating a use case in which there is inter-prediction across video transition boundaries of same color space according to various embodiments of the present disclosure.

Referring next to FIG. 13 a method 1300 in which there is inter-prediction across video transition boundaries of same color space is discussed according to various embodiments of the present disclosure. In method 1300, the color space is restricted to be YCbCr (or YUV) if video segments other than 4:4:4 video are present in the video stream, but the inter prediction can cross the video transition boundary. Since video can have different picture resolution at video transition boundary, the reference picture up- or down-sampling is needed in some embodiments.

In some embodiments, the luma picture size is further restricted to be the same, then only the down- and up-sampling process of Chroma reference pictures needs to be specified (e.g. from 4:4:4 to 4:2:0, from 4:2:0 to 4:4:4, etc.). During the video transition from 4:4:4 to 4:2:0, the Chroma reference pictures in the decoder picture buffer of the 4:4:4 video segment needs to be down-sampled to create reference picture that 4:2:0 video can use. Similarly, during the video transition from 4:2:0 to 4:4:4, the Chroma reference pictures in the decoder picture buffer of the 4:2:0 video segment needs to be up-sampled to produce reference picture that 4:4:4 video can use. This is a relatively easy process because Chroma down- or up-sampling factor is restricted to be 2 in this particular example.

In other embodiments, luma picture size at transition boundary can be different. In this case, the down- and up-sampling process of both luma and Chroma reference pictures needs to be specified. In addition, the reference picture down- or up-sampling process of arbitrary ratio rather than fixed ratio should be specified.

Figure 14:
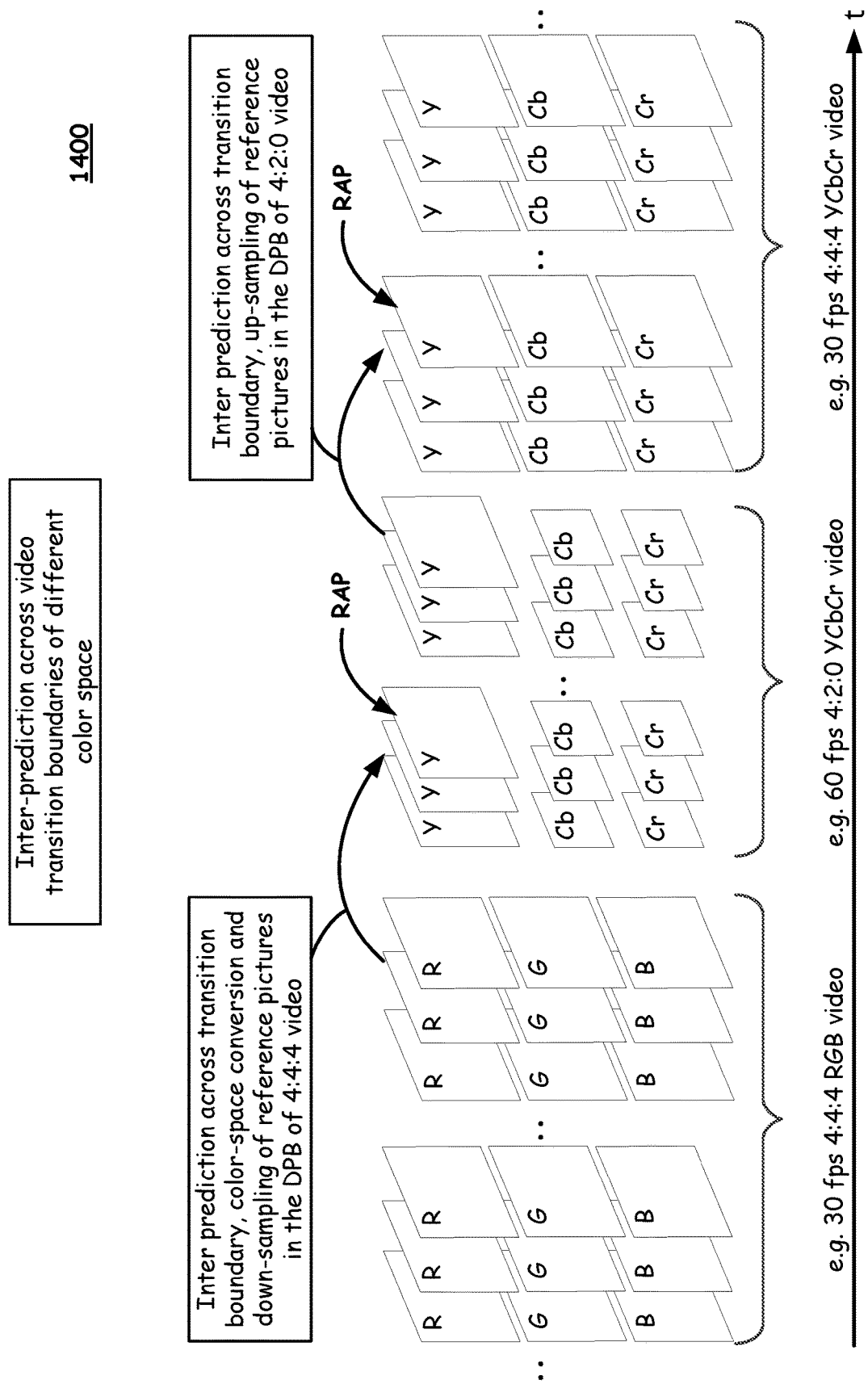
FIG. 14 is a diagram illustrating a use case in which there is inter-prediction across video transition boundaries of different color spaces according to various embodiments of the present disclosure.

Referring next to FIG. 14 a method 1400 in which there is inter-prediction across video transition boundaries of different color spaces is discussed according to various embodiments of the present disclosure. As illustrated by method 1400, the inter prediction can cross the video transition boundary and the color space can also be different. The color space changes can mean color gamut changes such as Rec. BT.2020 vs. Rec. BT.709 and color format changes such as RGB vs. YCbCr (YUV).

In one of embodiments, the luma picture size is still restricted to be the same, then only the color space conversion (e.g. RGB to YCbCr, YCbCr to RGB, etc.) and the down- and up-sampling process of Chroma reference pictures (e.g. from 4:4:4 to 4:2:0, from 4:2:0 to 4:4:4, etc.) need to be specified. In FIG. 14 for example, since the video content transits from 4:4:4 RGB to 4:2:0 YCbCr, the reference pictures in the decoder picture buffer of the 4:4:4 video segment are first converted from RGB to YCbCr, then Chroma Cb and Cr reference pictures are down-sampled to create reference pictures that 4:2:0 YCbCr video can use. Likewise, if the video content transits from 4:2:0 YCbCr to 4:4:4 RGB (not shown in FIG. 14), the Chroma reference pictures in the decoder picture buffer of the 4:2:0 video decoder picture buffer are first up-sampled, then color space conversion from YCbCr to RGB is performed to create reference pictures that 4:4:4 RGB video can use.

In other embodiments, luma picture size at transition boundary can be different. In addition to color space conversion of reference pictures, a luma/Chroma reference picture down- or up-sampling process of arbitrary ratio should be specified.

Different reference picture manipulation processes (i.e. color space conversion, reference picture up- and down-sampling) can be used in conjunction with methods 1300 and 1400. For example, conversion can be done on-the-fly block by block in some embodiments. Alternatively, picture-based conversion can be performed in advance, and the converted reference pictures can be pre-stored in decoder picture buffer.

In some embodiments, the video bit-depth can be different at the video transition boundary. In some such cases, the reference picture manipulation process would need to consider video bit-depths before and after the transition.

Figure 15:
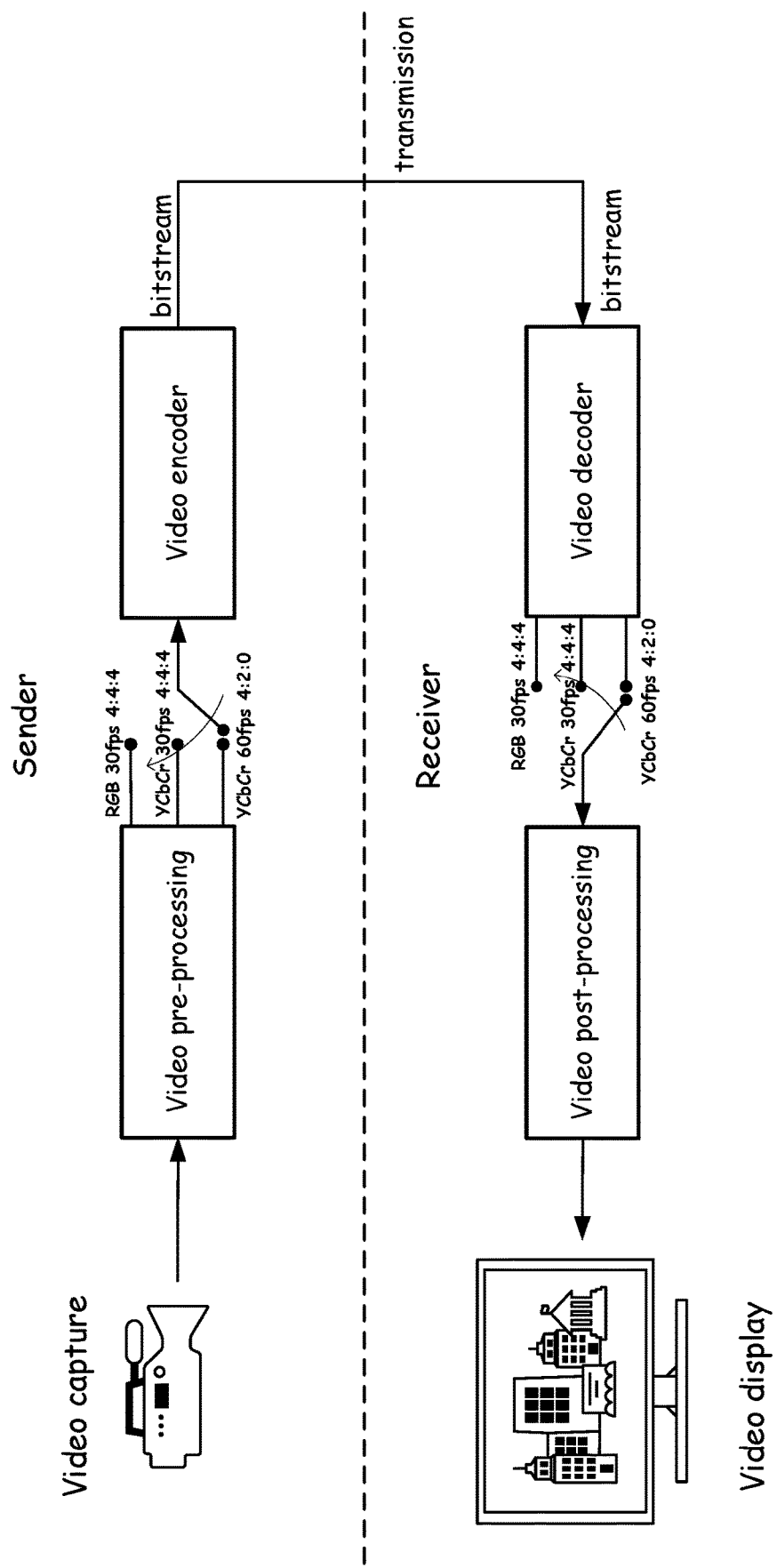
FIG. 15 is a diagram illustrating an end-to-end video capture and playback system according to various embodiments of the present disclosure.

Referring next to FIG. 15 an end-to-end video capture and playback system 1500 is discussed according to various embodiments of the present disclosure. In various embodiments of system 1500, the video pre-processing block can perform the following steps:

1. Perform optical-electro transfer function (OETF) to covert video from 4:4:4 linear RGB to non-linear 4:4:4 RGB.

2. If required video output format is non-4:4:4 YCbCr (e.g. 4:2:0), first convert video from non-linear RGB to 4:4:4 YCbCr format in reduced bit-depth (e.g. 10-bit), then down-sample video from Chroma format 4:4:4 to e.g. 4:2:0.

3. Otherwise, if required video output format is 4:4:4 YCbCr, convert video from non-linear RGB to 4:4:4 YCbCr format in reduced bit-depth (e.g. 10-bit).

4. Otherwise, if required video output format is 4:4:4 RGB convert video from non-linear RGB to non-linear 4:4:4 RGB format in reduced bit-depth (e.g. 10-bit).

Based on video characteristics the video pre-processing block may choose to convert the video in one of video formats (e.g. 2160p@30 4:4:4 RGB, 2160p@30 4:4:4 YCbCr or 2160p@60 4:2:0 YCbCr) and deliver it to the video encoder for compression.

The video encoder is designed in a way that it can take video of different formats (frame-rate, Chroma-format, RGB vs. YCbCr etc.) as input and compress the video according to a video standard such as ISO/IEC MPEG HEVC/ITU-T H.265. The compressed bitstream is packetized and transmitted to the receiver side.

On the receiver side, the video decoder is capable of taking a video bitstream of different formats (e.g. 2160p@30 4:4:4 RGB, 2160p@30 4:4:4 YCbCr or 2160p@60 4:2:0 YCbCr) as input and de-compressing it into one of video formats based on video format (frame-rate, Chroma-format, RGB vs. YCbCr etc.) signaled in the incoming bitstream. The decoded video is delivered to the video post-processing block for display processing. The interface between the video decoder and the video post-processing block could be HDMI (High-Definition Multimedia Interface).

In the video post-processing block, the following steps may be performed:

1. If the decoder output video Chroma format is non-4:4:4 (e.g. 4:2:0, 4:2:2) YCbCr, up-sample the Chroma to 4:4:4 YCbCr, then convert the resulting 4:4:4 YCbCr video to non-linear 4:4:4 RGB.

2. Otherwise, if the decoder output video Chroma format is 4:4:4 YCbCr, convert 4:4:4 YCbCr video to non-linear 4:4:4 RGB.

3. Otherwise, the decoder directly outputs video Chroma format in 4:4:4 non-linear RGB.

4. Perform electro-optical transfer function (EOTF) to covert video from non-linear 4:4:4 RGB to linear 4:4:4 RGB, The video after video post processing is sent to display. Note that in this end to end system, the required resource (in terms of memory bandwidth, memory size, etc.) is the same for different video formats. For example, if the system supports 2160p@60 4:2:0 YCbCr, then no additional resource is needed for the system to support 2160p@30 4:4:4 RGB or YCbCr.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A video decoder comprising:
an input configured to receive an input video stream encoded in any of a plurality of different formats, wherein the plurality of different formats includes:
 a first format having a first combination of frame rate and Chroma fidelity;
 a second format having a second combination of frame rate and Chroma fidelity;
a picture buffer configured to buffer reference pictures and currently reconstructed pictures during video decoding, wherein the picture buffer has a size selected to accommodate a maximum number of color pictures; and
a processor and associated memory configured to decode both a first input video stream encoded in the first format and a second input video stream encoded in the second format using the same picture buffer, a same amount of memory bandwidth, and a same pixel processing speed by exercising a trade-off between Chroma fidelity and frame rate.

2. The video decoder of claim 1, wherein:
the first format is encoded using a 4:2:0 Chroma fidelity;
the second format is encoded using 4:4:4 Chroma fidelity; and
the first format has a frame rate double the frame rate of the second format.

3. The video decoder of claim 1, wherein the size of the picture buffer is selected to account for differences in video-bit depth.

4. The video decoder of claim 1, wherein the processor and associated memory are further configured to:
decode a mixed input video stream having a first portion encoded using the first format and a second portion encoded using the second format.

5. The video decoder of claim 4, wherein the processor and associated memory are further configured to:
perform inter-prediction processing on the mixed input video stream, where the inter-prediction processing crosses a transition boundary between the first portion encoded using the first format, and the second portion encoded using the second format.

6. The video decoder of claim 4, wherein the processor and associated memory are further configured to:
perform inter-prediction processing on the mixed input video stream, where the inter-prediction processing is restricted from crossing a transition boundary between the first portion encoded using first format, and the second portion encoded using the second format.

7. A video decoder comprising:
an input configured to receive input video bitstreams encoded in a plurality of different formats, the plurality of different formats including a first and second format, the first format having a decreased Chroma fidelity, a doubled maximum frame-rate and requiring a greater number of reference pictures relative to the second format;
processing circuitry configured to decode a particular input video bitstream, regardless of whether the particular input video bitstream is encoded the first format or the second format, wherein decoding is performed using a constant amount of memory bandwidth and pixel processing speed for both the first and second formats by exercising a trade-off between Chroma fidelity and frame rate, the processing circuitry including:
 an entropy decoder coupled to the input and configured to generate quantized transform coefficients, intra prediction modes, motion data, and filter parameters;
 an inverse quantization module coupled to the entropy decoder and configured to generate residual blocks based on the quantized transform coefficients;
 a prediction feedback loop coupled to the entropy decoder and configured to generate residuals based, at least in part, on the intra prediction modes and the motion data; and
 a picture buffer configured to store reference pictures and currently reconstructed pictures during video decoding, and having a maximum capacity determined by a maximum number of color pictures, wherein the same picture buffer is used to decode input video bitstreams encoded in the plurality of different formats.

8. The video decoder of claim 7, wherein:
the first format has an increased frame rate and a decreased Chroma fidelity compared to the second format.

9. The video decoder of claim 7, wherein:
the maximum capacity of the picture buffer takes into account differences in video-bit depth between the first format and the second format.

10. The video decoder of claim 7, wherein the processing circuitry is further configured to:
decode a mixed input video stream having a first portion encoded using the first format and a second portion encoded using the second format.

11. The video decoder of claim 10, wherein the processing circuitry is further configured to:
perform inter-prediction processing on the mixed input video stream, where the inter-prediction processing is restricted from crossing a transition boundary between the first portion encoded using first format, and the second portion encoded using the second format.

12. The video decoder of claim 10, wherein the processing circuitry is further configured to:
perform inter-prediction processing on the mixed input video stream, where the inter-prediction processing crosses a transition boundary between the first portion encoded using the first format, and the second portion encoded using the second format.

* * * * *